United States Patent [19]

Shaw

[11] Patent Number: 4,467,937

[45] Date of Patent: Aug. 28, 1984

[54] FILLER CAP ASSEMBLY

[75] Inventor: James R. Shaw, Amagansett, N.Y.

[73] Assignee: Shaw Aero Devices, Inc., East Hampton, N.Y.

[21] Appl. No.: 322,215

[22] Filed: Nov. 17, 1981

Related U.S. Application Data

[63] Continuation-in-part of Ser. No. 143,292, Apr. 24, 1980, abandoned.

[51] Int. Cl.³ ............................................. B65D 45/00
[52] U.S. Cl. ................................ 220/246; 220/86 R; 220/251; 220/DIG. 33
[58] Field of Search ............... 220/243, 246, 251, 210, 220/293, 86 R, 233, 234, 238, 304, DIG. 32, DIG. 33

[56] References Cited

U.S. PATENT DOCUMENTS

| 864,605 | 8/1907 | Brain . |
| 1,296,721 | 3/1919 | Voltz . |
| 1,786,332 | 12/1930 | Bradshaw ........................ 220/210 X |
| 1,995,468 | 3/1935 | Bowlus et al. ....................... 220/302 |
| 2,416,637 | 2/1947 | Minella, Jr. ........................... 220/302 |
| 2,616,583 | 11/1952 | Rausenberger ...................... 220/246 |
| 2,616,585 | 11/1952 | Condit et al. . |
| 3,035,734 | 5/1962 | DePew . |
| 3,173,570 | 3/1965 | DePew . |
| 3,276,615 | 10/1966 | DePew . |
| 3,280,372 | 10/1966 | DePew . |
| 3,289,442 | 12/1966 | Berger et al. .................... 220/210 X |
| 3,289,876 | 12/1966 | DePew . |
| 3,343,707 | 7/1967 | DePew et al. ....................... 220/246 |
| 3,391,817 | 7/1968 | Shaw . |
| 3,476,285 | 11/1969 | DePew . |
| 3,557,993 | 1/1971 | DePew . |
| 4,132,327 | 1/1979 | Van Dyke et al. ................. 220/251 |

FOREIGN PATENT DOCUMENTS 412461 4/1925 Fed. Rep. of Germany ...... 220/293

Primary Examiner—Allan N. Shoap
Attorney, Agent, or Firm—Pennie & Edmonds

[57] ABSTRACT

A filler cap assembly including a filler cap and an adapter member for attachment to the opening in a fuel tank. The adapter has a central opening therein for receipt of the filler cap. The inner periphery of the adapter about the central opening has a raised convex seat and the cap has a flanged outer periphery with the undersurface grooved to form a concave surface mating with the raised seat of the adapter. The cap also includes seal means along the concave surface of the flange for sealing against the seat of the adapter.

15 Claims, 4 Drawing Figures

FILLER CAP ASSEMBLY

CROSS-REFERENCE TO RELATED APPLICATION

This application is a continuation-in-part of Ser. No. 143,292 filed Apr. 24, 1980 for "Filler Cap Assembly", now abandoned.

BACKGROUND OF INVENTION

1. Field of the Invention

The invention relates to a filler cap assembly for gas tanks providing a seal which remains undisturbed upon damage to the tank in the area of the filler cap. It also relates to a filler cap assembly having an adapter which can be mounted to a gas tank filler pipe to accept a filler cap, the cap and adapter constructed according to the invention.

2. Description of the Prior Art

Filler cap assemblies used for fuel tanks require that the cap produce a seal when inserted into locked position within a filling opening in the fuel tank. Typically, assemblies of this type include an adapter which is annular in shape and permanently attached to the opening of the fuel tank. The adapter includes a central opening in which the filler cap is seated.

With fuel tanks used in road vehicles such as trucks where there is a possibility of damage to the fuel tank upon the vehicle being involved in an accident, it is necessary that the filler tank construction be such as to avoid leakage of the fuel. One area particularly susceptible to leakage upon damage to the fuel tank is the area around the filler cap. If this area is damaged to the extent of changing the configuration of the sealing surface between the cap and the adapter, leakage of fuel can occur.

A typical prior art filler cap assembly is disclosed in U.S. Pat. No. 3,391,817. Assemblies of this type include a filler cap having an outer surface adapted to telescopically seat within an adapter with the seal between the cap and the adapter being effected along the inner peripheral surface of the adapter. The filler cap as disclosed in the above-referenced patent is one which is constructed for attachment to the adapter of the assembly by a retaining mechanism as opposed to relying on a threaded connection. The retaining mechanism is attached to the lower end of the cap and cooperates with the undersurface of the adapter. When the cap is inserted into the opening of the adapter, a handle on the cap is manipulated to effect locking of the retainer.

A second type of filler cap assembly includes a sealing means on the undersurface of the cap for cooperating with the top of an adapter member. Typical constructions of this type are disclosed in U.S. Pat. Nos. 2,616,583 and 2,616,585. These constructions provide for sealing on an upper surface of the adapter as opposed to an internal surface; but they make no provision for holding the seals upon damage to the tank in the area of assembly. Upon impact, the sealing area will tend to be distorted due to the configuration of the sealing surfaces and their orientation with respect to the remaining structure of the assembly.

A third type of filler cap construction includes an externally threaded surface for mating with a threaded opening in the filler tank. In some circumstances, these constructions are less susceptible to damage causing leakage; but because of the threaded connection, the cap has a tendency to unthread under vibration or wearing of the threaded connection and thus permit leakage.

SUMMARY OF THE INVENTION

In accordance with the teachings of the present invention, a filler cap assembly is provided in which the construction of the cap and adapter and its connection to the fuel tank provides a seal which will remain undisturbed in the event of damage to the tank in the area of the assembly. Generally, the adapter is provided with a raised convex seat on its inner peripheral edge for mating engagement with a concave surface in the bottom of the cap of the assembly. An O-ring seal is provided in the cap and protrudes outwardly at the concave surface for sealing engagement with the raised seat of the adapter. The concave surface on the cap is formed on a peripheral flange portion of the cap and this flange is adapted to engage against the top of the seat of the adapter. The cap has an inner end which telescopes into the central opening in the adapter as defined by the raised seat.

The adapter is connected to the wall of the fuel tank so that both the raised seat of the adapter and the overlying upper end of the cap, including the flange portion, are disposed above the tank wall. The filler cap of the assembly is thus purposely oriented in exposed position where impact in the area of the assembly as may result if the vehicle is involved in an accident will be against the cap. Due, however, to the particular connection of the cap to the adapter as described above and due to the connection of the adapter to the fuel tank wall, such impact will be transferred from the cap through the seat of the adapter and the body of the adapter and to the adjacent wall of the tank without upsetting the sealing relationship between the cap and adapter.

The filler cap of the present invention may also be used with an adapter comprising a generally annular ring with an inner diameter adapted to be connected to the end of a fuel tank filler pipe. This adapter has a configuration similar to the adapter which is connected directly to the wall of the tank and cooperates with the tank and filler cap in substantially the same manner.

DESCRIPTION OF THE PREFERRED EMBODIMENTS

Figure 1:
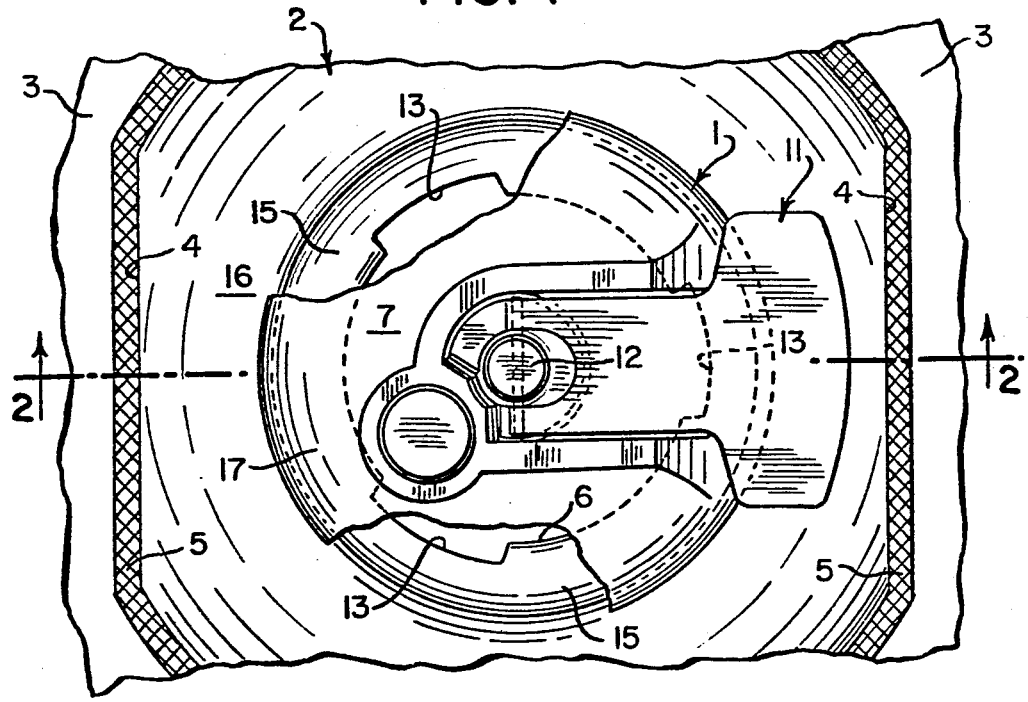
FIG. 1 is a top view of the filler cap assembly partially cut away to show the structure of the adapter.

As shown in the drawings, the filler cap assembly is comprised of a filler cap 1 and an adapter 2. The adapter is secured to a filling opening in a fuel tank wall 3 as by welding along its outer peripheral edge 4. The weld is shown at 5. The adapter is preferably secured to the wall of the fuel tank is overlying relationship. The inner periphery of the adapter defines a central opening 6 in which the filler cap is inserted.

The filler cap itself includes a base member 7 formed of substantial structure, preferably as a casting. The base member 7 has a lower end 8 adapted to be telescopically received within the central opening of the adapter and an upper end 9 adapted to face outwardly of the opening. A retaining member 10 is attached to the lower end of the base member for cooperating with the undersurface of the adapter to lock the cap within the central opening.

An operating handle 11 is disposed at the upper end of the base member and connected by way of the operating shaft 12 to the retaining member 10. Manipulation of the handle operates the retaining member to rotate it between locked and unlocked positions with respect to the adapter. As shown in FIG. 1, the inner periphery of the adapter is provided with radially outwardly extending cutouts 13 with which the locking surfaces 14 of the retaining member align for removal of the filler cap from the adapter. The construction of the filler cap assembly as just given is conventional and may be such as disclosed in the above-referenced U.S. Pat. No. 3,391,817.

In accordance wih the teachings of the present invention, the inner periphery of the adapter is raised from the radially outwardly adjacent portion of the tank wall. More specifically, in the embodiment of FIGS. 1 and 2, the adapter includes a raised convexly curved seat 15. This seat is raised relatively to the radially outwardly adjacent portion 16 of the adapter and from the immediately underlying tank wall 3. The seat is curved at a predetermined uniform radius; and as shown in FIG. 2, the seat faces outwardly of the central opening 6 in the adapter.

For cooperating with the convexly curved seat 15 of the adapter, the upper end of the base member of the cap includes a radially outwardly extending flange portion 17 adapted to be received over the seat. The flange portion has a lower concave surface 18 complementary in shape to the curved seat of the adapter. More specifically, the concave surface is formed on a radius of uniform dimension slightly greater than the radius defined by the seat of the adapter. The undersurface of the flange also includes an O-ring groove 19 extending around the cap and in which a resilient O-ring 20 is disposed. The O-ring protrudes outwardly of the groove so as to provide a seal between the cap and the adapter when the cap is in locked position within the adapter.

To center the cap within the adapter, the lower end of the cap is formed with an outer peripheral surface 21 which is cylindrical. Similarly, the inner surface of the adapter at its lower end is also formed as a cylindrical surface 22. The cylindrical surface of the adapter is spaced radially inwardly of and below the raised convexly curved seat. The cylindrical surface 22 is connected to the seat by a radially outwardly flared planar surface 23. Similarly, the outer cylindrical surface 21 of the filler cap is connected to the concave surface 18 by a complementary shaped flared surface 24. These surfaces generally mate with each other upon locking of the cap into the adapter with a slight clearance with the protruding O-ring 20 providing a seal between the cab and adapter.

Figure 2:
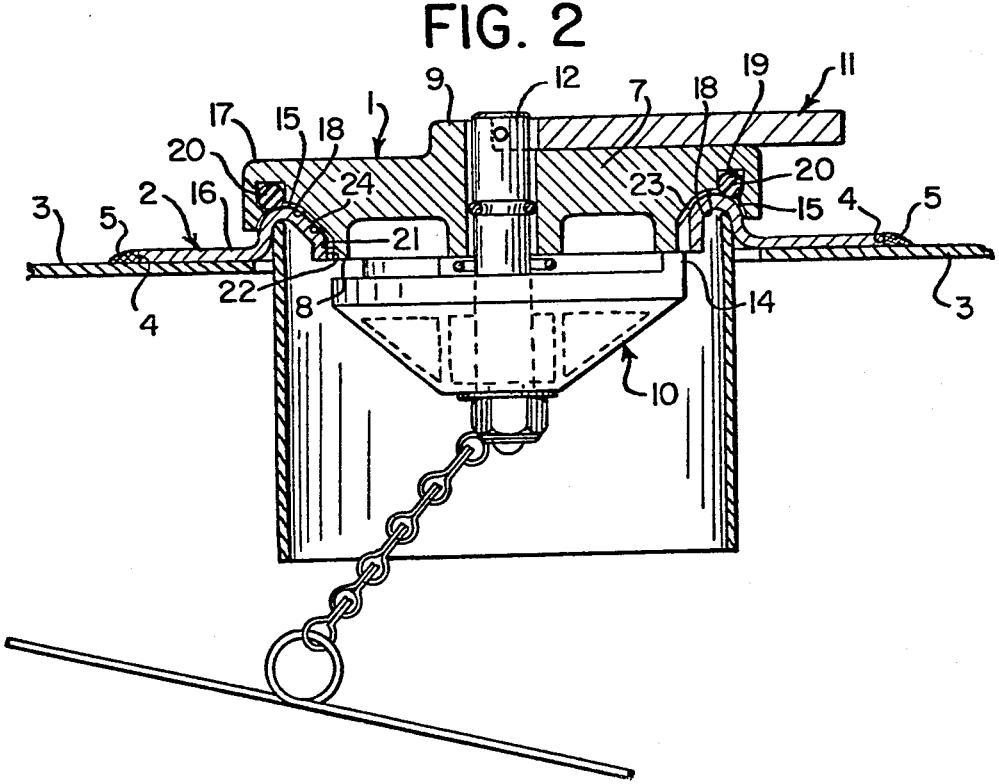
FIG. 2 is a cross-sectional view taken along lines 2—2 of FIG. 1.

As also shown in FIG. 2, the O-ring groove 19 is disposed in opposed aligned relation with the radially outwardmost portion of the seat 15. Thus, the O-ring effects a seal along the radially outwardmost portion of the seat. This is of advantage in that it prevents leakage that might otherwise occur due to damage of the seat as caused by nicking of the seat by the fuel nozzle when filling the tank. Such nicking usually would occur along the innermost portion of the seat rather than along the outermost portion which is very unlikely to be hit during normal use.

As clearly shown in FIG. 2, both the raised seat of the adapter and the upper end of the filler cap are oriented in exposed position outwardly of the wall 3 of the fuel tank. This construction and the particular structure in the seal area provides an assembly which will distribute impact forces from the cap to the wall of the tank via the adapter. More specifically, the initial impact on the handle and the exposed portion of the cap will be distributed around the diameter of the assembly in the area of the seal. The load of the impact is then transferred to the adapter which can pivot inwardly to thus transfer the load to the tank wall 3.

Because of the radius of the seat 15 of the adapter and the complementary radius of the concave surface 18 of the cap, impact against the cap will not produce destructive torsional loading and twisting of the adapter which would produce leakage. The load is, instead, distributed around the whole diameter of the assembly; and impact against the cap will actually cause metal wear of the seat 15 of the adapter into the concave surface 18 of the cap around the entire interlocked area of the cap and adapter. This strengthens the seal between the seat 15 and concave surface 18 and functions to limit twisting and stop the adapter from going out of round.

The outer cylindrical surface 21 of the filler cap mating with the inner cylindrical surface 22 of the adapter centers the cap from the inside of the adapter while the radiused seat 15 of the adapter cooperating with the radiused surface 18 on the cap centers and limits twisting from outside stresses. Thus, loads impacting against the adapter, as might be caused by impact against the end of the fuel tank, will be transferred to the cap and the centering of the cap within the adapter will prevent the adapter from twisting out of shape. Instead, it will remain round in the area of the seat to maintain the proper seal with the cap. Also, any loads impacting against the fuel tank wall will be absorbed in the same way with the filler cap mounted flush or below the wall of the fuel tank.

Figure 3:
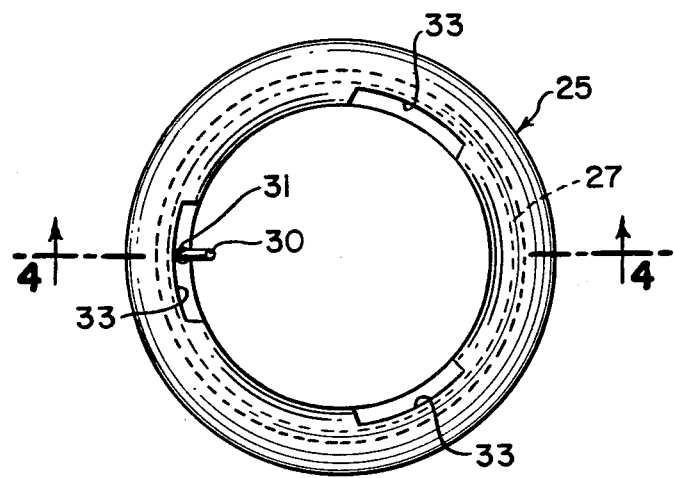
FIG. 3 is a plan view of an adapter configured to attach to a gas tank filler pipe.
Figure 4:
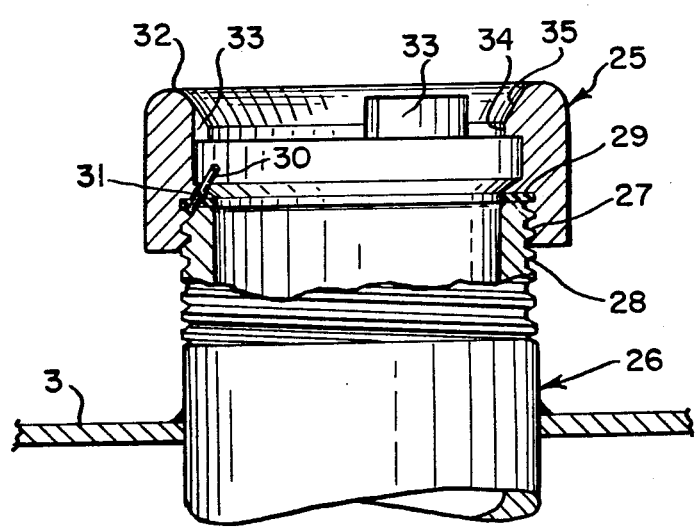
FIG. 4 is a partial cross-sectional view taken along line 4—4 of FIG. 3.

In the embodiment shown in FIGS. 3 and 4, the adapter 25 of the present invention is connected to a filler pipe 26 extending from the wall 3 of the tank. The filler pipe defines the opening in the tank through which fuel is pumped. The adapter 25 in this embodiment is cylindrical in shape and has its lower end provided with internal threads 27 which mate with external threads 28 on the filler pipe.

Gasket 29 is disposed in a thread relief area between adapter 25 and the top end of pipe 26. A thread interference pin 30 is wedged into the mating threads through slot 31 to assure that adaptor 25 will remain locked against rotation on the pipe.

The upper end of the adapter has a periphery which surrounds the opening through the pipe and this periphery defines a raised convexly curved seat 32 which corresponds to the convexly curved seat 15 of the adapter shown in FIGS. 1 and 2. This seat faces outwardly of the opening through the filler pipe. About the periphery of the adapter radially outwardly extending cutouts 33 are provided. These cutouts correspond to the cutouts 13 in the adapter shown in FIGS. 1 and 2.

The adapter of FIGS. 3 and 4 further includes an inner cylindrical surface 34 and a planar surface 35 connecting the cylindrical surface 34 to the seat 32. The cylindrical surface 34 and the planar surface 35 correspond to the cylindrical surface 22 and planar surface 23 of the embodiment as shown in FIGS. 1 and 2. In all respects, the adapter shown in FIGS. 3 and 4 cooperates with the filler cap and tank in the same manner as does the adapter of FIGS. 1 and 2.

I claim:

1. In a filler cap assembly for a tank having an opening in the wall thereof, an adapter connected to the tank around the opening and an inner periphery defining a central opening therethrough, a filler cap having a base member with a lower end adapted to be received within said central opening and an upper end adapted to face outwardly thereof, a retaining member connected to the lower end of the base member for cooperating with the adapter to lock the cap within the central opening, an operating handle disposed at the upper end of the base member and connected to the retaining member for moving the latter between locked and unlocked positions with respect to the adapter, and seal means attached to the base member of the cap for sealing engagement with the adapter when the retaining member is in the locked position, the improvement wherein:
   (a) the periphery of the adapter is raised from the radially outwardly adjacent portion of the tank wall and includes a raised convexly curved seat of predetermined radius facing outwardly of the central opening in the adapter;
   (b) the upper end of the base member of the cap includes a radially outwardly extending flange portion adapted to be received over the seat of the adapter, said flange portion having an upper surface exposed to impact striking and a lower concave surface complementary in shape to the curved seat for mating therewith for direct surface to surface engagement upon impact striking of the upper surface of said flange portion;
   (c) the concave surface of the flange portion of the base member includes an O-ring groove; and
   (d) said seal means comprises a resilient o-ring disposed within said groove and only partially extending outward thereof beyond the concave surface of the flange portion to normally space the concave surface of the flange portion and the convex seat of the adapter from each other while permitting said surface to surface engagement upon impact striking of the upper surface of said flange portion.

2. In the filler cap assembly as set forth in claim 1, the improvement wherein:
   (a) the flange of the cap is free of structure around its outer periphery.

3. In the filler cap assembly as set forth in claim 2, the improvement wherein:
   (a) the raised convexly curved seat of the adapter is formed at a predetermined uniform radius; and
   (b) the lower concave surface in the flange of the base member is formed at a radius slightly greater than that of the seat of the adapter.

4. In the filler cap assembly as set forth in claim 3, the improvement wherein:
   (a) the seal means is disposed along the concave surface of the base member in opposed aligned relation with the radially outwardmost portion of the convexly curved seat of the adapter.

5. In the filler cap assembly as set forth in any one of claims 1, 2, 3 or 4 the improvement wherein:
   (a) the adapter further includes an outer peripheral edge disposed in overlapping relation to the wall of the tank around the opening therein.

6. In the filler cap assembly as set forth in claim 5, the improvement wherein:
   (a) the outer peripheral edge of the adapter is welded to the wall of the tank on the outside thereof.

7. In the filler cap assembly as set forth in any one of claims 1, 2, 3 or 4 for a tank with the opening therein defined by a filler pipe connected to the tank wall and extending outwardly thereof, the improvement wherein:
   (a) the adapter is cylindrical in shape with one end connected to the filler pipe and the other end defining said periphery of the adapter.

8. In the filler cap assembly as set forth in claim 7, the improvement wherein:
   (a) the one end of the adapter is threaded into the terminal end of the filler pipe in locked relationship therewith.

9. In the filler cap assembly as set forth in any one of claims 1, 2, 3 or 4, the improvement wherein:
   (a) the radial inwardmost portion of the inner periphery of the adapter includes a cylindrical surface with the longitudinal axis thereof extending perpendicular to the plane of the central opening; and
   (b) the lower end of the base member of the cap includes a cylindrical surface complementary in shape to the cylindrical surface of the adapter for matching therewith upon insertion into said central opening.

10. In the filler cap assembly as set forth in claim 9, the improvement wherein:
    (a) the cylindrical surface of the adapter is spaced radially inwardly of and below the raised convexly curved seat thereof and connected thereto by a radially outwardly flared planar surface; and
    (b) the base member of the cap includes a complementary shaped flared surface connecting its cylindrical surface with its concave surface for mating therewith upon insertion of the lower end of the base member into the central opening of the adapter.

11. In a filler cap assembly for a tank having an opening in the wall thereof, an adapter connected to the tank around the opening and having a periphery defining a central opening therethrough, a filler cap having a base member with a lower end adapted to be received within said central opening and an upper end adapted to face outwardly thereof, a retaining member connected to the lower end of the base member for cooperating with the adapter to lock the cap within the central opening, an operating handle disposed at the upper end of the base member and connected to the retaining member for moving the latter between locked and unlocked positions with respect to the adapter, and seal means attached to the base member of the cap for sealing engagement with the adapter when the retaining member is in the locked position, the improvement wherein:
    (a) the adapter includes a raised portion defining an outwardly facing, convexly curved seat of a first predetermined radius of curvature and having a top, circumferential crest extending around the central opening, an outer surface extending downward and radially outward from said top crest, and an inner surface extending downward and radially inward from said top crest;
    (b) the base member of the cap includes a radially outwardly extending flange portion having an upper surface exposed to impact striking, said flange also defining an inwardly facing, concave seat cover of a second predetermined radius of curvature, and extending over and in a complementary fit with the convex seat defined by the raised portion of the adapter having an upper surface for direct surface to surface engagement upon impact striking of the upper surface of said flange portion;

(c) said seal means is radially located outside the crest of the raised portion of the adapter, engages the outer surface of said raised portion, and urges the seat and seat cover from each other; and (d) the second radius of curvature is slightly greater than the first radius of curvature whereby the seat and seat cover are normally in the complementary fit while slightly spaced apart.

12. In the filler cap assembly as set forth in claim 11, the improvement wherein:

(a) the concave surface of the flange portion of the base member includes an O-ring groove; and (b) the seal means comprises a resilient O-ring disposed within said groove and partially extending outwardly thereof.

13. A filler cap assembly for use with a tank having a wall defining a tank opening, the filler cap assembly comprising:

(a) an adapter including:
  (1) an outside portion for connecting the adapter to the wall of the tank around the tank opening,
  (2) an inside portion defining a central adapter opening, and
  (3) a raised portion extending between the inside and outside portions of the adapter, the raised portion of the adapter having:
    (i) a top, circumferential crest annularly extending around the adapter opening,
    (ii) an outside surface extending downward and radially outward from the circumferential crest, and
    (iii) an inside surface extending downward and radially inward from the circumferential crest, the inside and outside surfaces of the raised portion being radially spaced from each other;

(b) a cap including:
  (1) a base supported by the adapter and extending within the central opening thereof and having a radially extending flange defining an inside surface extending over and complementary to both the inside and outside surfaces of the raised portion of the adapter to inhibit distortion of the complementary fit between the raised portion of the adapter and the radial flange of the base, and
  (2) retaining means attached to the base for securely connecting the cap to the adapter; and (c) seal means attached to the base and engaging the raised portion of the adapter to inhibit fluid flow between the cap and the adapter said seal means normally spacing the complementary surfaces of the flange and adapter while permitting surface to surface engagement upon impact striking of said flange.

14. A filler cap assembly according to claim 13 wherein:

(a) the base defines an annular groove extending above the outer surface of the raised portion of the of the adapter; and (b) the seal means is secured within and extends outside the annular groove and engages the outside surface of the raised portion of the adapter.

15. A filler cap assembly according to claim 14 wherein:

(a) the inner portion of the adapter includes a cylindrical surface with the longitudinal axis thereof extending perpindicular to the plane of the central opening; and (b) the base includes a cylindrical surface located adjacent to and complementary with the cylindrical surface of the adapter.

* * * * *